United States Patent [19]
Yuki et al.

[11] Patent Number: 6,065,555
[45] Date of Patent: May 23, 2000

[54] POWER-ASSISTED WHEELBARROW

[75] Inventors: Hitoshi Yuki; Yoshihisa Hirose, both of Saitama, Japan

[73] Assignee: Honda Giken Kogyo Kabushiki Kaisha, Tokyo, Japan

[21] Appl. No.: 09/048,997

[22] Filed: Mar. 27, 1998

[30] Foreign Application Priority Data

Mar. 28, 1997 [JP] Japan ..................................... 9-078157

[51] Int. Cl.[7] .............................. B62D 51/04; B62B 1/00
[52] U.S. Cl. ......................... 180/19.1; 180/19.3; 280/653
[58] Field of Search ................... 180/19.1, 19.2, 180/19.3, 315, 318, 320; 280/653, 655, 659

[56] References Cited

U.S. PATENT DOCUMENTS

| | | |
|---|---|---|
| 2,253,288 | 8/1941 | De Lucchi . |
| 3,896,892 | 7/1975 | Kohls et al. . |
| 4,589,508 | 5/1986 | Hoover et al. ........................ 180/19.1 |
| 5,489,000 | 2/1996 | Hillbohm ............................... 180/19.1 |
| 5,732,786 | 3/1998 | Fujigaki ................................. 180/19.3 |

FOREIGN PATENT DOCUMENTS

| | | |
|---|---|---|
| 0 691 232 | 1/1996 | European Pat. Off. . |
| 3-100568 | 10/1991 | Japan . |
| 7-40354 | 7/1995 | Japan . |

*Primary Examiner*—Paul N. Dickson
*Assistant Examiner*—Faye M. Fleming
*Attorney, Agent, or Firm*—Arent, Fox, Kintner, Plotkin & Kahn

[57] ABSTRACT

A power-assisted wheelbarrow applies an assisting function using an electric motor. Handle shafts connecting to the rear end portions of two handles are covered with grips which are allowed to move axially relative to the handle shafts. More than one steel balls are fitted between the handle shafts and the grips. At the sides of the grips or the handles, pushing force detecting sensors are disposed for detecting the axial movements of the grips relative to the handle shafts in accordance with the pushing forces applied to the grips. The operation of the electric motor is controlled on the basis of the detected values of the two pushing force detecting sensors. As a result, the assisting force by the electric motor can be effectively applied to the wheel of a manual-push type single-wheeled carrier so that manual labor can be reduced while minimizing the consumption of a battery.

10 Claims, 9 Drawing Sheets

POWER-ASSISTED WHEELBARROW

BACKGROUND OF THE INVENTION

1. Field of the Invention

The present invention relates to a wheelbarrow such as a manual-push type single-wheeled carrier and, more particularly, to a power-assisted wheelbarrow having an electric motor for assisting with moving the wheelbarrow.

2. Related Art

A wheelbarrow such as a manual-push single-wheeled carrier can easily pass through a narrow road and is widely used for carrying materials, parts, harvests or fertilizers at jobsites, in fields, fruit farms, mountains or forests. Since the carrier is pushed manually, however, it requires heavy manual labor on roads covered with pebbles or bricks or on slopes of severe gradients, so that the range of its application is restricted.

As disclosed in Japanese Utility Model Laid-Open Nos. 3-100568 and 7-40354, therefore, carriers are disclosed in which manual labor is reduced by giving the wheel an assisting force of an electric motor activated by electric power supplied from a battery.

In the carriers disclosed in Japanese Utility Model Laid-Open Nos. 3-100568 and 7-40354, a constant assisting force is applied from an electric motor to the wheel by turning on a switch which is mounted on the rear end portion of the handles of the manual-push carrier. At this time, the constant assisting force has to be set to a relatively high level so as to avoid providing an assisting force which is too low. If the movement by the assisting force is continued, the electric motor generates a larger assisting force than necessary so that the battery is inconveniently depleted early. If the capacity of the battery is increased, an increase in the weight of the carrier causes an operation problem because the function of the wheelbarrow is deteriorated.

SUMMARY OF THE INVENTION

The invention has been conceived in view of the background thus far described and has an object to provide a power-assisted walking carrier in which an assisting force by an electric motor is effectively applied to a wheel to reduce manual labor while minimizing the power consumption of a battery.

In order to achieve the above-specified object, according to a first aspect of the invention, there is provided a power-assisted wheelbarrow comprising: a tray frame; a wheel carried at a center of a lower portion of the tray frame; a pair of right and left handles respectively extending backward from two sides of the tray frame; an electric motor mounted on the tray frame; power transmission means interposed between the wheel and the electric motor for transmitting a power between the electric motor and the wheel only when the electric motor is active; a pair of handle shafts fixed on the rear end portions of the handles and extending backward; cylindrical grips individually covering the handle shafts coaxially and axially movable relative to the handle shafts within a limited range; more than one steel balls retained between each of the handle shafts and each of the grips; elastic means sandwiched between each handle shaft and each grip for biasing each grip elastically backward; pushing force detecting sensors mounted individually at the grips or at the handles for detecting the axial movements of the grips relative to the handle shafts in accordance with the pushing forces applied to the grips; and control means for controlling the operation of the electric motor on the basis of the detected values of the pushing force detecting sensors.

According to construction of this first aspect, the pushing forces acting upon the grips are transmitted through the elastic means to the handle shafts and the handles. The axial movements of the grips relative to the handle shafts in accordance with the pushing forces are detected as the pushing forces acting on the grips individually by the pushing force detecting sensors, so that the operation of the electric motor is controlled by the control means on the basis of the values detected by the pushing force detecting sensors. As a result, the assisting force by the electric motor is applied to the wheel in accordance with the pushing forces so that manual labor can be reduced in pushing a fully-loaded wheelbarrow on rough ground or over pebbly ground. With an empty tray or in a lightly loaded state on a flat area, the consumption of the power of the battery can be suppressed to a low value without activating the electric motor. Moreover, the wheelbarrow is pushed by lifting the grips to apply the pushing forces to the handles. With steel balls being fitted between the grips and the handle shafts, however, the axial movements of the grips relative to the handle shafts can be smoothed even if the lifting loads are applied to the grips. Especially when carrying a load on a rough ground or a slope, the posture of the tray frame is liable to become unstable. Loss of balance is frequently supported strongly by the grip of the handle at one side. Even in this case, the axial relative movements of the grips can be effected accurately matching the pushing forces. Thus, the pushing forces to be applied to the grips can be detected by the pushing force detecting sensors to apply a proper assisting force to the wheel.

In addition to the construction of the first aspect, according to a second aspect of the invention, there are individually formed in the outer circumferences of the handle shafts and in the inner circumferences of the grips, a plurality of grooves which are spaced circumferentially of the handle shafts and the grips in at least three portions. The plurality of grooves extend axially to correspond to each other, so that more than one steel balls are retained between the handle shafts and the grips while being allowed to roll along the grooves. As a result, the grips are prevented from turning while holding the axes of the handle shafts and the grips coaxially, and therefore ensure the axial movements of the grips relative to the handle shafts.

In addition to the construction of the second aspect, according to a third aspect of the invention, there are coaxially arranged between the outer circumferences of the handle shafts and the inner circumferences of the grips, cylindrical support members which are individually provided with a plurality of support holes in positions corresponding individually to the grooves. The support members are spaced axially, so that the steel balls are individually held rollably in the support holes. As a result, the positions of the individual steel balls can be fixed in the axial directions of the handle shafts and the grips so that the grips can be supported by the handle shafts at the predetermined portions which are dispersed axially of the handle shafts and the grips.

The aforementioned and other objects, features and advantages of the invention will become apparent from the description of preferred embodiments, as will be detailed with reference to the accompanying drawings.

BRIEF DESCRIPTION OF THE DRAWINGS

In FIGS. 1 to 8 showing a first embodiment of the invention:

PREFERRED EMBODIMENTS OF THE INVENTION

Figure 1:
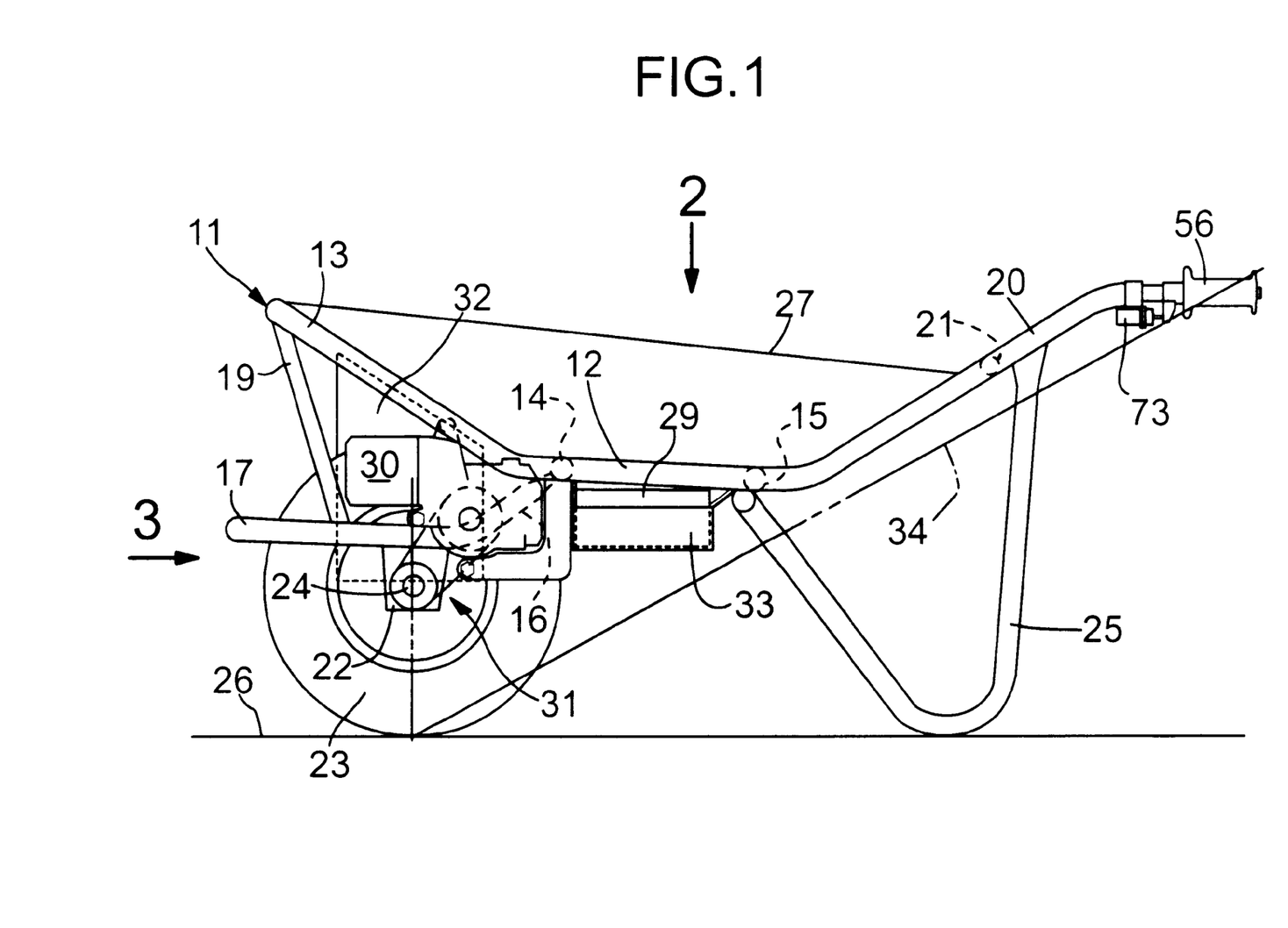
FIG. 1 is a side elevation showing a manual-type single-wheeled wheelbarrow.
Figure 2:
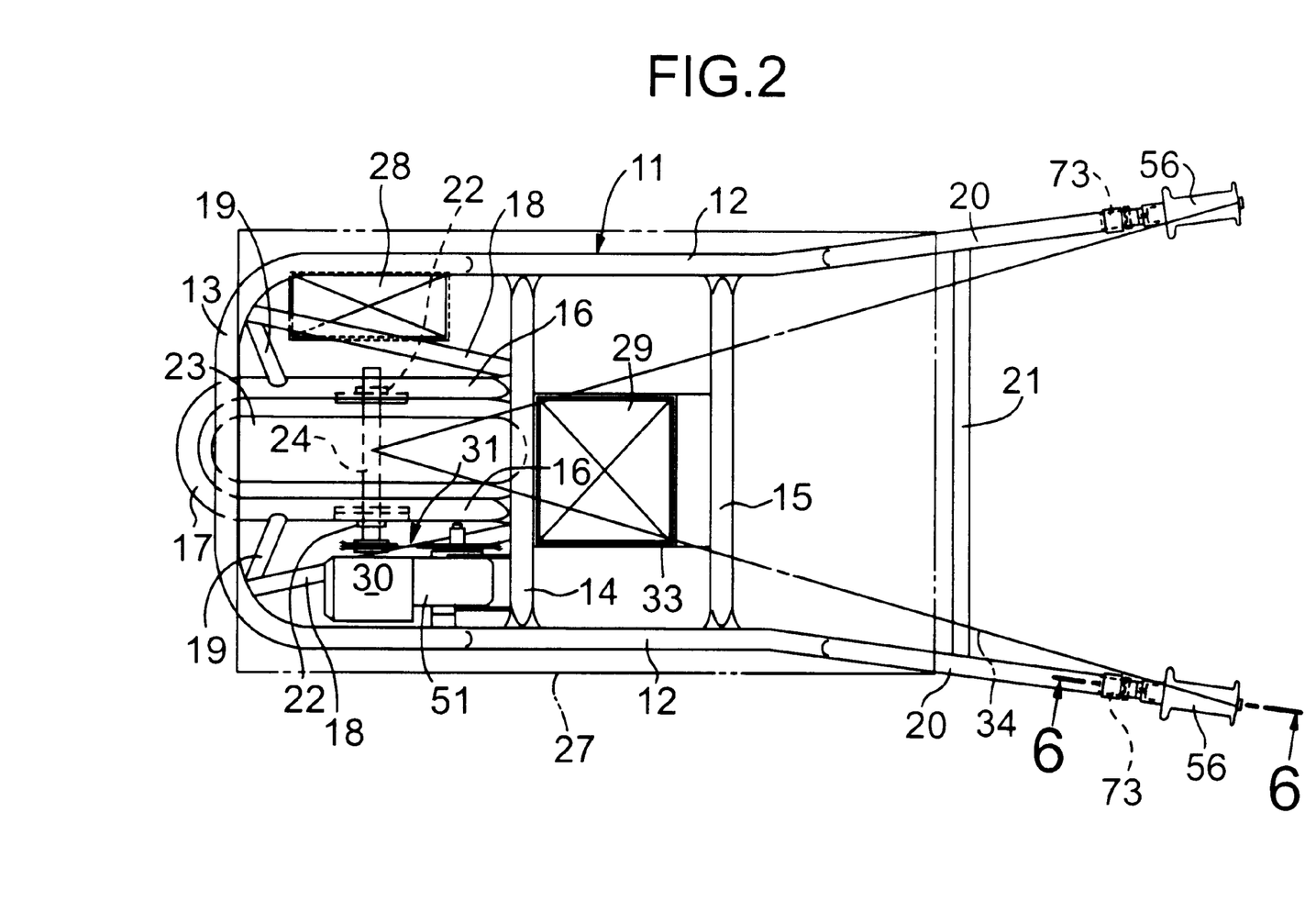
FIG. 2 is a top plan view taken in the direction of arrow 2 of FIG. 1.
Figure 3:
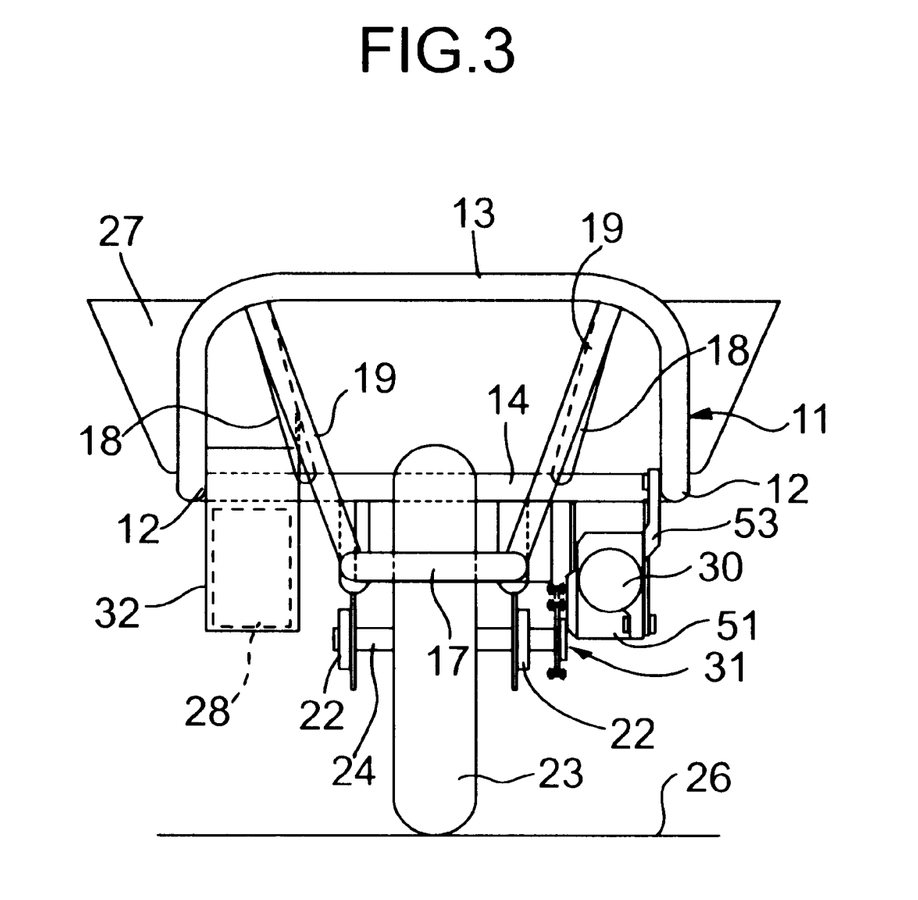
FIG. 3 is a front elevation taken in the direction of arrow 3 of FIG. 1.

A first embodiment of the invention will be described with reference to FIGS. 1 to 8. In FIGS. 1 to 3, a tray frame 11 belonging to a manual push type single-wheeled wheelbarrow is constructed to include; a pair of parallel frame portions 12 and 12 extending generally in parallel in a longitudinal direction; a joint frame portion 13 extended upwardly and forwardly to merge into the front ends of the two parallel frame portions 12 and 12 and formed generally into a U-shape which is closed at the front end portion; a pair of front and rear cross frame portions 14 and 15 crossing the two parallel frame portions 12 and 12; a pair of right and left support frame portions 16 and 16 extending downwardly and forwardly between the two parallel frame portions 12 and 12 to merge into the front cross frame portion 14; a wheel supporting frame portion 17 formed generally into a U-shape which is closed at the front side to merge into the two support frame portions 16 and 16; a pair of right and left reinforcing frame portions 18 and 18 extending between the front portion of the joint frame portion 13 and the front cross frame portion 14; and a pair of right and left reinforcing frame portions 19 and 19 extending between the front portion of the joint frame portion 13 and the wheel supporting frame portion 17.

Provided to the rear ends of the two parallel frame portions 12 and 12 are the front ends of a pair of right and left handles 20 and 20, the handles 20 and 20 extending upwardly and backwardly. A reinforcing frame 21 crosses the two handles 20 and 20. Moreover, the two parallel frame portions 12 and 12, the joint frame portion 13 and the handles 20 and 20 are integrally formed by bending a metallic pipe.

On the other hand, the support frame portions 16 and 16 and the wheel supporting frame portion 17 are integrally formed by bending a metallic pipe. An axle 24 of a single wheel 23 is rotatably supported by a pair of right and left bearing portions 22 and 22 which are fixed on the wheel supporting frame portion 17.

Between the rear portions of the two parallel frame portions 12 and 12 and the intermediate portions of the two handles 20 and 20, the upper ends of leg portions 25 and 25 are fixed. The leg portions 25, 25, are formed into a generally triangular shape. These leg portions 25 and 25 are formed to hold the posture of the tray frame 11 such that the two parallel frame portions 12 and 12 are generally in parallel with the ground 26 when the leg portions 25 and 25 and the wheel 23 are resting on the ground 26.

A dish-shaped tray 27 is placed on the two parallel frame portions 12 and 12, the joint frame portion 13 and the front portions of the handles 20 and 20.

Under the tray frame 11 are mounted not only first and second batteries 28 and 29 but also a) an electric motor 30 which is activated by electric power from batteries 28 and 29, and b) power transmission means 31, which is interposed between the electric motor 30 and the wheel 23. The power transmission means 31 is for transmitting an assisting force, as generated by the operation of the electric motor 30, to the wheel 23.

The first battery 28 is mounted under the tray frame 11 at one of the right and left sides of the wheel 23, i.e., at the righthand side of the wheel 23, facing in the forward direction, in this embodiment. At the righthand side of the joint frame portion 23, a battery tray 32 is fixed. The first battery 28 is mounted on the battery tray 32.

The second battery 29 is mounted under the tray frame 11 at the back of the wheel 23. On the front and rear cross frame portions 14 and 15, a battery tray 33 is fixed, on which the second battery 29 is mounted. Moreover, the battery tray 33, i.e., the second battery 29, is arranged to keep the balance transversely of the wheel 23. The arrangement is so determined that at least a portion, desirably most of the second battery 29, may be located in a virtual triangle 34 which is defined, when viewing the tray frame 11 downwardly, by jointing the grounding portion of the wheel 23 and the rear end portions of the two handles 20.

Figure 4:
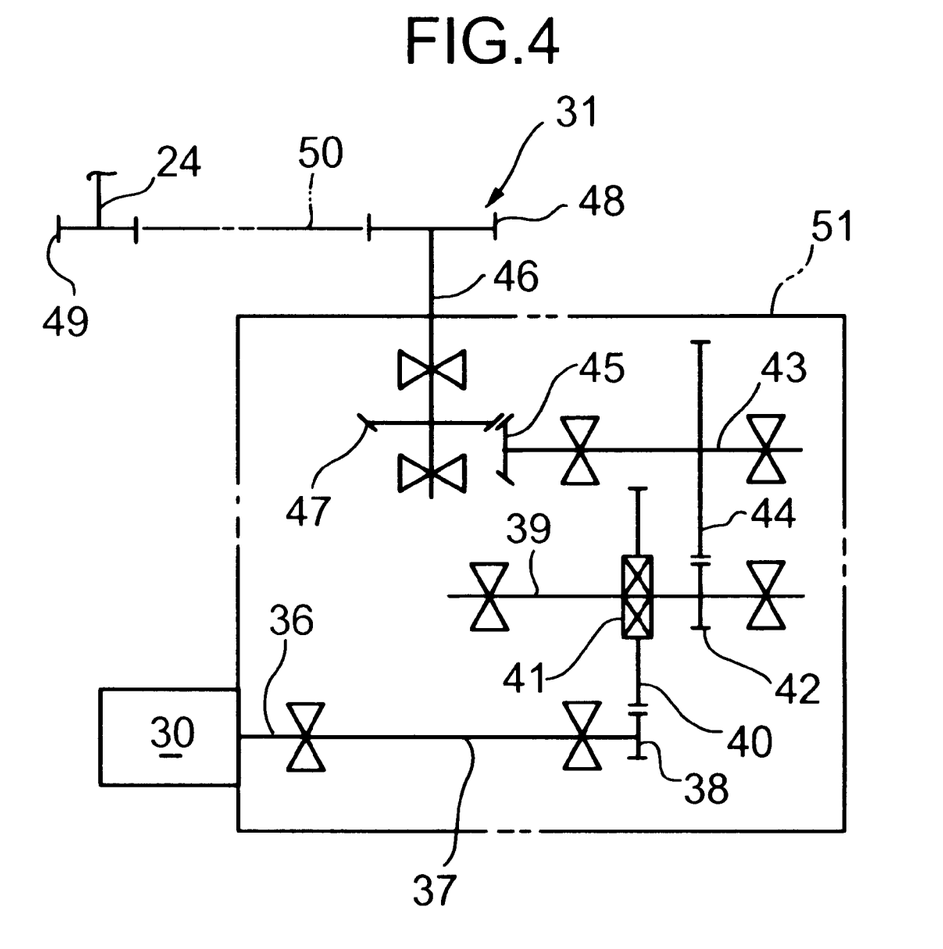
FIG. 4 is a diagram showing a construction of a power transmission means.

As shown in FIG. 4, the power transmission means 31 is constructed to include: a drive shaft 37 connected coaxially to an output shaft 36 of the electric motor 30; a first gear 38 fixed on the drive shaft 37; a first intermediate shaft 39 having an axis parallel to the drive shaft 37; a second gear 40 coaxial with the first intermediate shaft 39 and meshing with the drive gear 38; a one-way clutch 41 interposed between the first intermediate shaft 39 and the second gear 40; a third gear 42 fixed on the first intermediate shaft 39; a second intermediate shaft 43 having an axis in parallel with the first intermediate shaft 39; a fourth gear 44 fixed on the third intermediate shaft 43 while meshing with the third gear 42; a fifth gear 45 formed as a bevel gear and fixed on the second intermediate shaft 43; a driven shaft 46 having an axis perpendicular to the second intermediate shaft 43; a sixth gear 47 fixed as a bevel gear and fixed on the driven shaft 46 while meshing with the fifth gear 45; a sprocket 48 fixed on the driven shaft 46; a sprocket 49 fixed on the axle 24 of the wheel 23; and an endless chain 50 reeved aroung the two sprockets 48 and 49.

In this power transmission means 31, the drive shaft 37, the first gear 38, the first intermediate shaft 39, the second gear 40, the one-way clutch 41, the third gear 42, the second intermediate shaft 43, the fourth gear 44, the fifth gear 45, a portion of the driven shaft 46 and the sixth gear 47 are accommodated in a gear housing 51, to which the electric motor 30 is coupled. The individual shafts 37, 39, 43 and 46 are rotatably carried in the gear housing 51. The sprocket 48 is fixed on the end portion of the driven shaft 46 and protrudes from the gear housing 51.

The one-way clutch 41 transmits the power from the second gear 40 to the first intermediate shaft 39, but inhibits the power transmission from the first intermediate shaft 39 to the second gear 40. Thus, the power transmission means 31 is constructed to allow the power transmission between the electric motor 30 and the wheel 23 only when the electric motor 30 is active.

The electric motor 30 and the power transmission means 31 thus constructed are mounted at the opposite side from the first battery 28 with respect to the wheel 23, that is, at the lefthand side from the wheel 23, when facing forwardly, and under the tray frame 11 in this embodiment.

Figure 5:
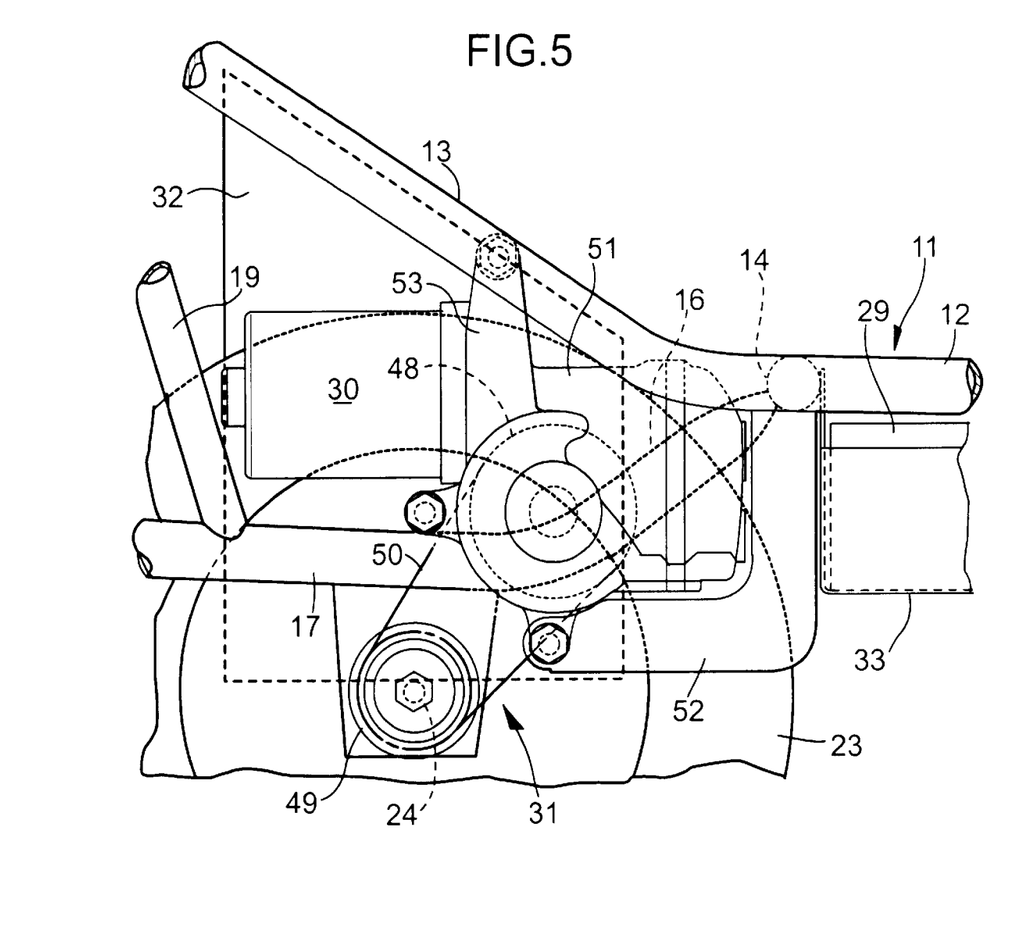
FIG. 5 is an enlarged diagram showing an essential portion of FIG. 1.

With reference to FIG. 5, a support arm 52 is fastened at its front end to the gear housing 51. With the gear housing 51, there is integrated a support arm 53 which extends upwardly. The rear end of the support arm 52 is fixed on the cross frame portion 14, and the upper end of the support arm 53 is fastened to the joint frame portion 13.

Figure 6:
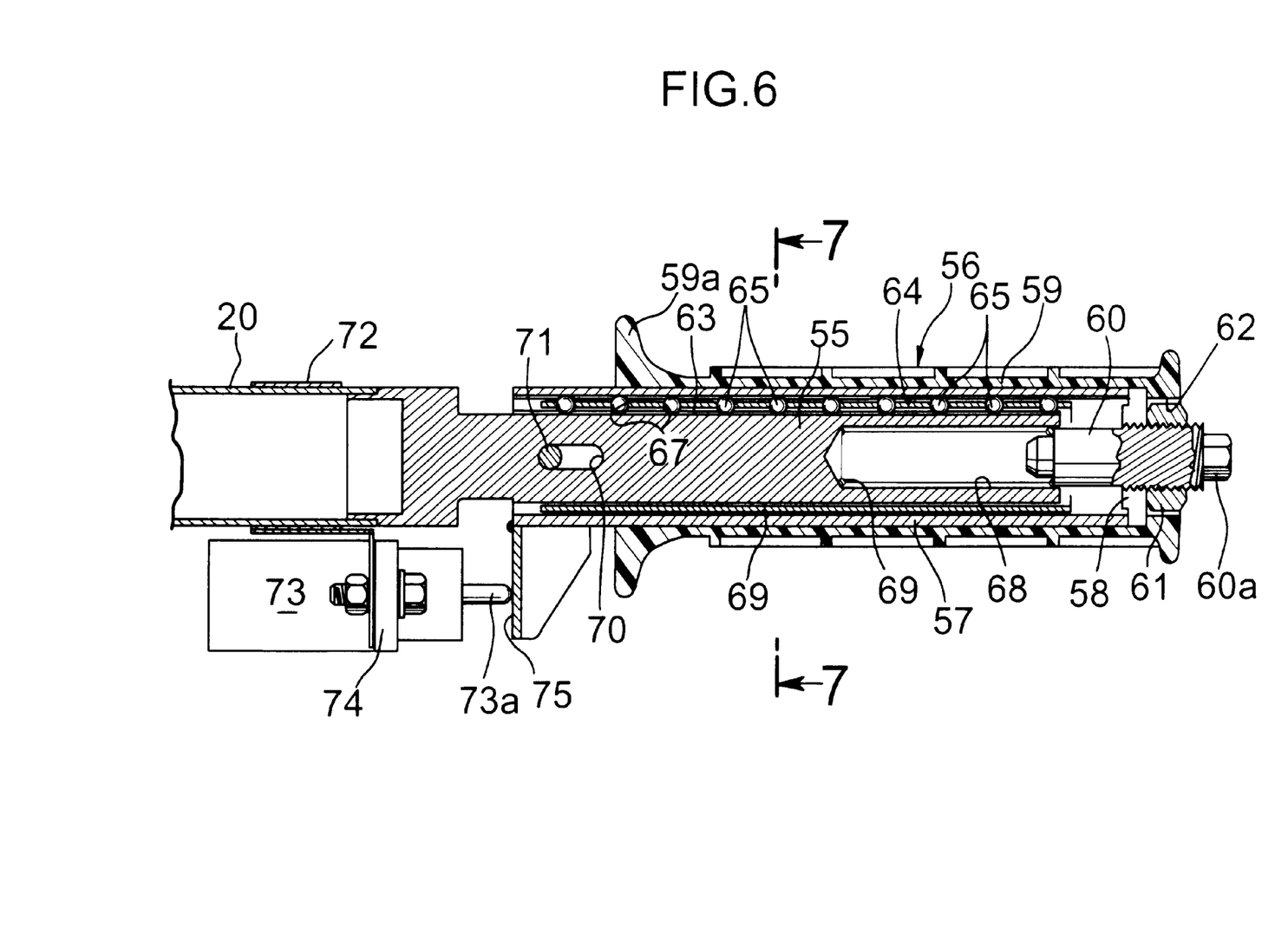
FIG. 6 is an enlarged section taken along line 6—6 of FIG. 2.
Figure 7:
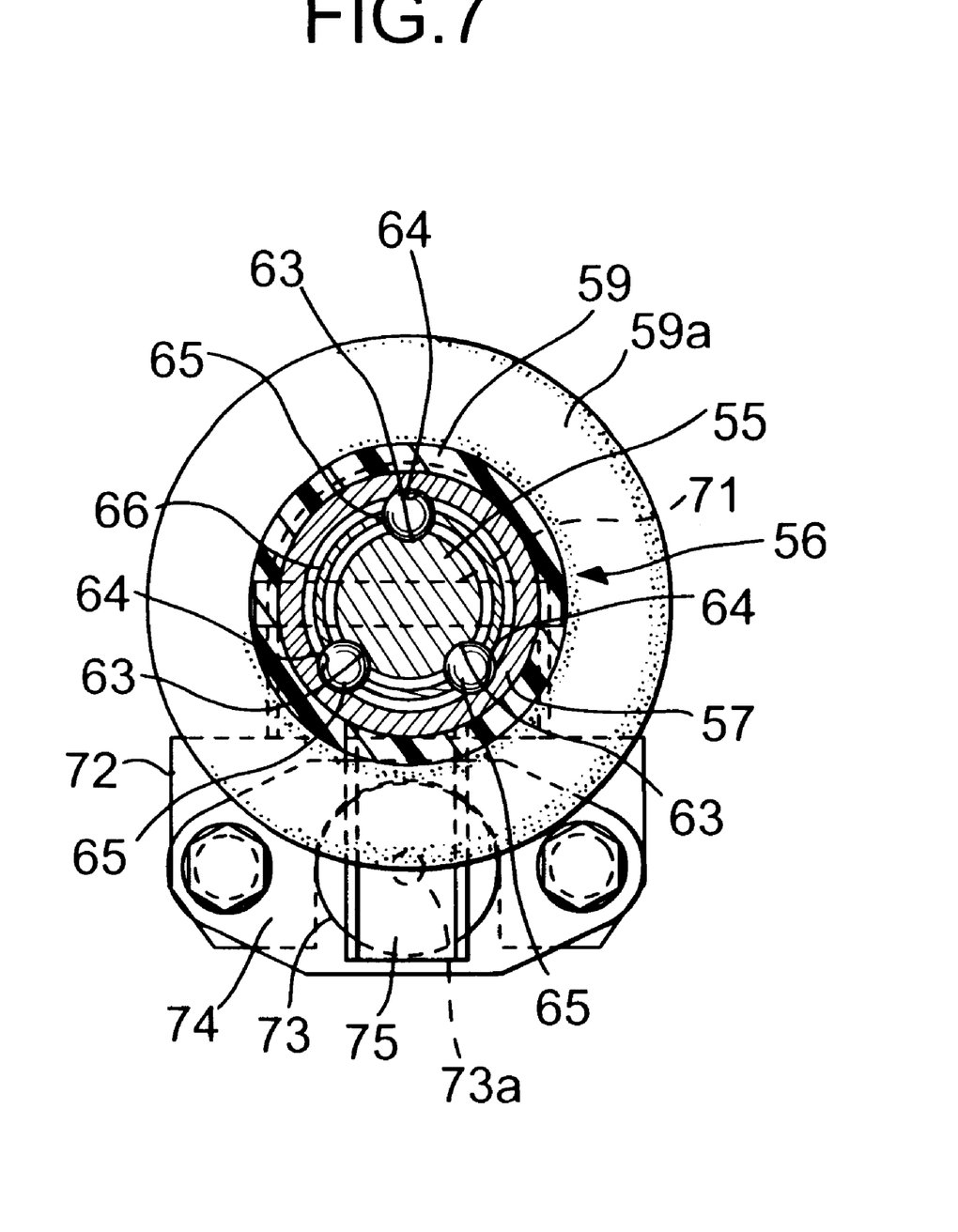
FIG. 7 is an enlarged section taken along line 7—7 of FIG. 6.

To the rear end portions of the two handles 20, as shown in FIGS. 6 and 7, there are fixed the front ends of handle shafts 55 which extend backward, and most of the handle shafts 55, except that their front portions, are individually covered with grips 56.

Each grip 56 is constructed to include: a metallic, cylindrical support sleeve 57 covering the handle shaft 55 coaxially; a cover member 58 fixed on the support sleeve 57 to close the rear end opening of the support sleeve 57; and a cover member 59 made of a synthetic resin and covering most of the support sleeve 57 integrally except at the front portion of the sleeve 57. On the cover member 58, there is screwed axially movably back and forth an adjust shaft 60 which has an engagement control portion 60a at its outer end and has its inner end inserted into the support sleeve 57. A stop nut 61 is screwed on the adjust shaft 60 to come into engagement with the outer face of the cover member 58. Moreover, an opening 62 for allowing the turning of the nut 61 is formed in the rear end of the cover member 59. A flange portion 59a, extending radially outward, is formed integrally with the front end of the cover member 59.

In the outer circumference of the handle shaft 55, there are formed grooves 63 which axially extend and are spaced circumferentially of the handle shaft 55 in at least three portions, i.e., equally spaced at three portions in the circumferential direction in this embodiment. In the inner circumference of the grip 56, i.e., in the inner circumference of the support sleeve 57, three axially extending grooves 64 are formed which correspond to the individual grooves 63 of the handle shaft 55.

Between the handle shaft 55 and the grip 56, there are arranged a plurality of steel balls 65 which are so fitted in the corresponding grooves 63 and 64 as to roll along the two grooves 63 and 64. As a result, the grip 56 can be axially moved with respect to the handle shaft 55 by rolling the individual steel balls 65.

Between the outer circumference of the handle shaft 55 and the inner circumference of each grip 56, there is coaxially arranged a cylindrical support member 66. The support member 66 has a plurality of support holes 67, which are axially spaced at positions corresponding to the corresponding grooves 63 and 64 to retain the individual steel balls 65 individually rolling in those support holes 67.

In the rear end portion of the handle shaft 55, there is coaxially formed a fitting hole 68 which has a closed inner end for slidably receiving the front end portion of the adjust shaft 60. Between the closed inner end portion of the fitting hole 68 and the front end portion of the adjust shaft 60, there is sandwiched a coil spring 69 for biasing the grip 56 elastically backward with respect to the handle shaft 55.

In the front portion of the handle shaft 55, a slot 70 is formed which is elongated axially of the handle shaft 55 and which is opened at its two sides into the outer circumference of the handle shaft 55. In the grip 56, a regulate pin 71 is fitted which extends along one diameter of the grip 56 and which is inserted in the slot 70. The pin 71 regulates the axial movement of the grip 56 relative to the handle shaft 55 within a range in which the regulate pin 71 abuts against the two ends of the slot 70.

When a pushing force is applied to each grip 56 to push the wheelbarrow forward, each grip 56 is moved forward with respect to the handle shaft 55 to a position where the spring force of the coil spring 69 and the aforementioned pushing force are balanced. Thus, the pushing force can be detected by detecting the forward stroke of each of the grips 56. By adjusting the forward and backward positions of the adjust shafts 60, it is possible to adjust the forward strokes of the grips 56 to correspond to the spring forces of the coil springs 69, i.e., the pushing forces.

In order to detect the forward strokes of the grips 56, i.e., the pushing forces to be applied to the grips 56, a flange 74 of a pushing force detecting sensor 73, having a detector 73a directed backward, is fastened on a bracket 72 which is fixedly mounted on the rear end portion of the handle 20. An abutment plate 75, to contact with the detector 73a, is fixed on the front end portion of the support sleeve 57 in the grip 56.

The pushing force detecting sensor 73 is mounted on the rear end portion of each of the two handles 20 and 20 so that the pushing forces, acting on the two grips 56 and 56 mounted on the rear end portions of the two handles 20 and 20, may be individually detected by detecting the moving strokes of the grips 56 and 56.

Figure 8:
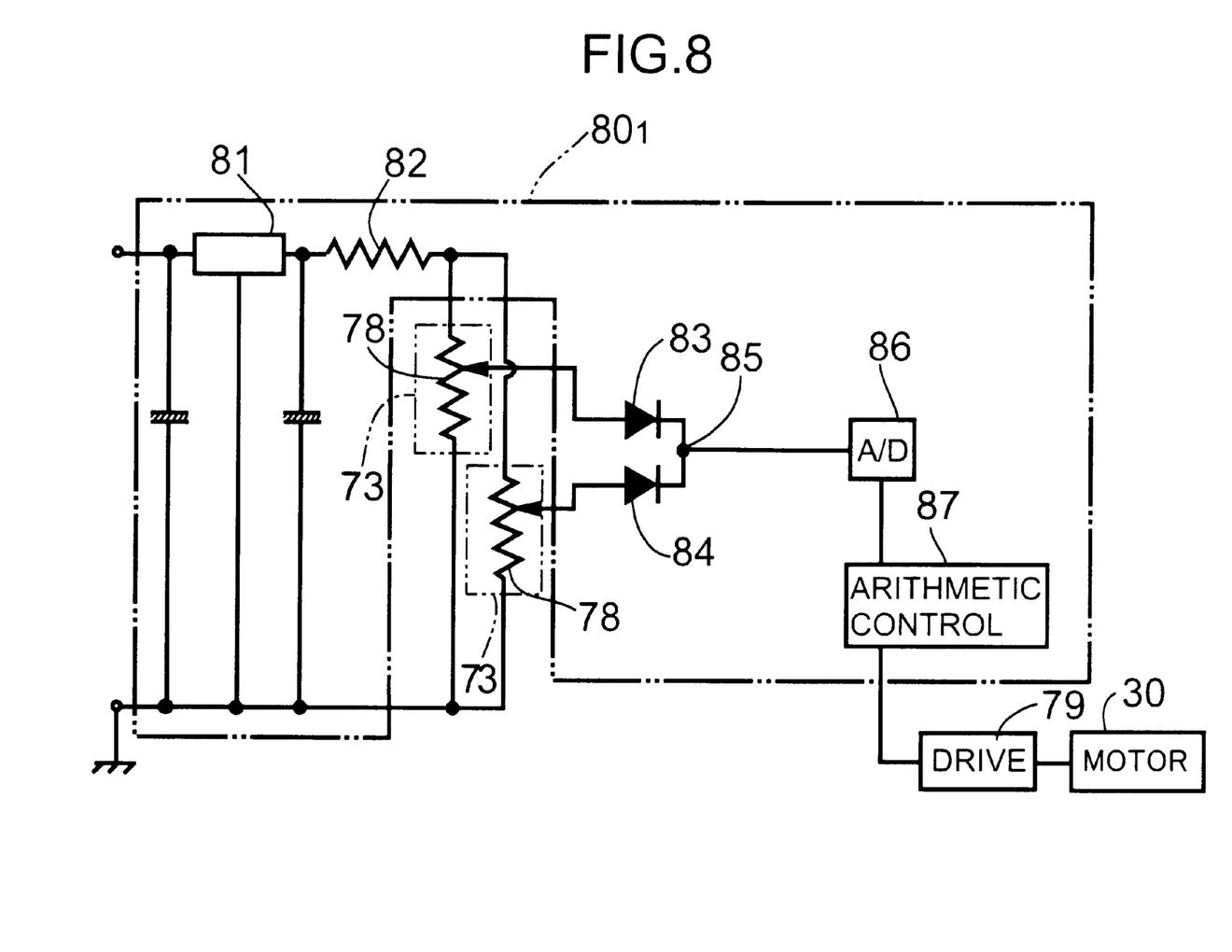
FIG. 8 is a diagram showing a construction of control means of a first embodiment.

As shown in FIG. 8, each of the two pushing force detecting sensors 73 and 73 is equipped with a variable voltage-dividing resistor 78 for changing the output voltage in accordance with the axial movement of the grip 56 relative to the handle shaft 55. On the basis of the detected values of the two pushing force detecting sensors 73 and 73, i.e., the output voltages, the actions of drive means 79, for activating the electric motor 30, are controlled by control means 80$_1$.

This control means 80$_1$ is constructed to include: a regulator 81 for regulating the electric power of the first and second batteries 28 and 29 to a constant level; a voltage-dividing resistor 82 connected in series with the regulator 81 and in series with a parallel circuit composed of the two variable voltage-dividing resistors 78 and 78; diodes 83 and 84 connected individually with the output terminals of the two pushing force detecting sensors 73 and 73; an A/D converter 86 for converting the voltage, as generated at a node 85 connecting the diodes 83 and 84 with each other, that is, converting an analog electric signal into a digital electric signal; and an arithmetic control unit 87 for determining a control signal on the basis of the digital signal, as output from the A/D converter 86, to control the actions of the drive means 79 in response to the control signal.

According to the control means 80$_1$ thus constructed, the higher one of the detected values, i.e., the output voltages, as obtained from the two pushing force detecting sensors 73 and 73, is selected at the node 85 of the two diodes 83 and 84. The control means 80$_1$ controls the operations of the electric motor 30 on the basis of the aforementioned higher one of the values detected by the two pushing force detecting sensors 73 and 73, so that the electric motor 30 may generate an assisting force according to the higher detected value when this value exceeds a predetermined level.

The actions of this first embodiment will now be described. The first battery 28 having a relatively large weight, the electric motor 30 having a relatively large weight and the power transmission means 31 are separated on the right and left sides of the wheel 23 and are arranged under the tray frame 11 so that a satisfactory balance can be kept between the right and left sides of the wheel 23. This makes it easy to keep the posture of the tray frame 11 stable even during transportation on an rough ground or a slope, although the posture would otherwise be unstable.

In order to continue the assisting force of the electric motor 30 for a relatively long period of time, the second battery 29 is mounted on the tray frame 11 in addition to the first battery 28. This second battery 29 is mounted at the back of the wheel 23 and under the tray frame 11 and is arranged to be located at one of the points of the virtual triangle 34, as formed by joining the grounding portion of the wheel 23 and the rear end portions of the two handles 20 and 20, when viewing the tray frame 11 downwardly, thereby keeping the balance at the right and left sides of the wheel 23. As a result, the balance of the tray frame 11 can be held satisfactory while increasing the electric power capacity using the second battery 29.

Moreover, the grips 56, individually covering the handle shafts 55 which are fixed on the rear end portions of the two handles 20 and 20, can be axially moved within a limited range with respect to the handle shafts 55 and are individually biased elastically backward by the coil springs 69 which are sandwiched between the individual handle shafts 55 and the individual grips 56. As a result, the pushing forces acting on the grips 56 are transmitted through the coil springs 69 to the handle shafts 55 and the handles 20 and 20. The axial movements of the individual grips 56, relative to the individual handle shafts 55 in accordance with the pushing forces acting on the individual grips 56, are detected by the pushing force detecting sensors 73 and 73 which are individually disposed at the handles 20 and 20. When the higher one of the values detected by those pushing force detecting sensors 73 and 73 exceeds a predetermined level, the actions of the electric motor 30 are controlled by the control means $80_1$ on the basis of the higher detected value.

As a result, the assisting force by the electric motor 30 can be applied to the wheel 23 in accordance with the pushing forces applied to the handles 20 and 20. Therefore, reduced manual labor is required to move the carrier on an rough ground or ride over a pebbly ground even with the tray 27 fully loaded. However, when the carrier is moving over a flat road, with an empty or lightly loaded tray 27, the power consumption of the batteries 28 and 29 can be suppressed to a low level without activating the electric motor 30. Furthermore, when carrying a load on rough ground or a slope, the posture of the tray frame 11 may become unstable and cause different forces to be applied to the handles 20 and 20 for supporting the right and left sides. The loss of balance due to the unstable posture would therefore have to be frequently supported by one of the two handles 20 and 20. However, the activation of the electric motor 30 is controlled on the basis of the loaded state of the side of the right and left handles 20 and 20, at which the pushing force is higher or which is supported stronger, so that a proper assisting force can be applied to the wheel 23 in a manner to cope with the loss of balance coming from the unstable posture.

The carrier is pushed by raising the grips 56 to apply the pushing forces to the handles 20 and 20. Because steel balls 65 are retained between the grips 56 and the handle shafts 55, the axial movements of the grips 56 relative to the handle shafts 55 can be smoothed even if lifting loads are applied to the grips 56. Even when the loss of balance is strongly supported by the grip 56 of one of the two handles 20 and 20, the grip 56 can be relatively moved accurately matching the pushing force. The pushing force acting on the grip 56 can be detected by its detecting sensor 73 to apply the proper assisting force to the wheel 23.

Moreover, since the axially elongated grooves 63 and 64 are formed at three or more portions in the outer circumference of the handle shaft 55 and the inner circumference of the grip 56, the axially elongated grooves 63 and 64 allow the plurality of steel balls 65 to roll in each pair of the grooves 63 and 64. As a result, the grip 56 can be prevented from turning on its axis while holding the handle shaft 55 and the grip 56 in a coaxial relationship, thereby to positively ensure the axial movement of the grip 56 relative to the handle shaft 55.

Moreover, since the individual steel balls 65 are retained rollably one by one in the plurality of support holes 67, which are formed in the cylindrical support member 66 arranged between the outer circumference of the handle shaft 55 and the inner circumference of the grip 56, the positions of the individual steel balls 65 can be fixed in the axial direction of the handle shaft 55 and the grip 56. Even if a lifting load is applied to the grip 56, the grip 56 can be supported by the handle shaft 55 at the plurality of fixed portions which are dispersed in the axial direction of the handle shaft 55 and the grip 56.

Figure 9:
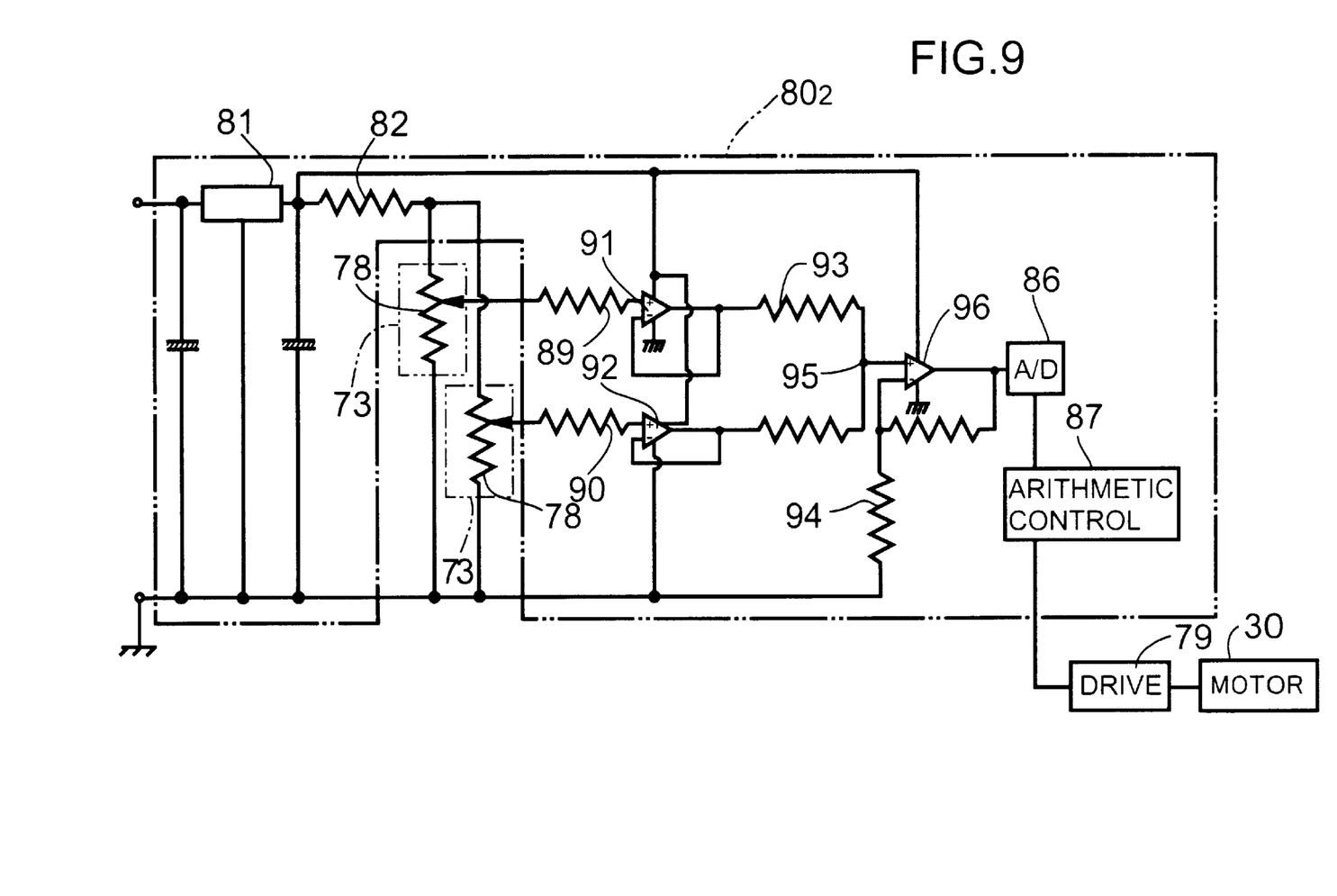
FIG. 9 is a diagram showing a construction of control means of a second embodiment.

FIG. 9 shows a second embodiment of the invention, in which the portions corresponding to those of the foregoing first embodiment are designated by common reference numerals.

Control means $80_2$ for controlling the actions of the drive means 79 on the basis of the detected values of the two pushing force detecting sensors 73 and 73, i.e., the output voltages, is constructed to include: the regulator 81 for regulating the electric power of the first and second batteries 28 and 29 to a constant level; the voltage dividing resistor 82 connected in series with the regulator 81 and in series with the parallel circuit composed of the two variable voltage-dividing resistors 78 and 78; resistors 89 and 90 connected individually with the output terminals of the two pushing force detecting sensors 73 and 73; amplifiers 91 and 92 connected individually in series with the resistors 89 and 90; resistors 93 and 94 connected individually in series with the output terminals of the two amplifiers 91 and 92 and with each other at a node 95; an amplifier 96 for receiving the voltage at the node 95; the A/D converter 86 for converting the output voltage of the amplifier 96, i.e., converting the analog electric signal into a digital electric signal; and the arithmetic control unit 87 for determining a control signal on the basis of the digital signal, as output from the A/D converter 86, to control the actions of the drive means 79 in response to the control signal.

According to the control means $80_2$ thus constructed, a voltage corresponding to the sum of the detected values of the two pushing force detecting sensors 73 and 73 is output from the amplifier 96. As a result, the control means $80_2$ controls the operation of the electric motor 30 on the basis of the sum of the detected values of the two pushing force detecting sensors 73 and 73 so that the assisting force can be controlled more finely according to the total load on the tray frame 11.

The invention can also be applied to a wheelbarrow which is equipped with an auxiliary wheel at the back of the wheel 23.

Although the invention has been described in detail in connection with its embodiments, the invention should not be limited thereto but can be modified in various designs without departing from the invention defined in the claims.

What is claimed is:

1. A power assisted wheelbarrow comprising:
   a tray frame;

a wheel carried at a center of a lower portion of said tray frame;

a pair of right and left handles respectively extending backward from two sides of said tray frame, said pair of right and left handles for carrying a material, to be placed on said tray frame, by combination of said wheel and said pair of right and left handles;

an electric motor mounted on said tray frame;

power transmission means interposed between said wheel and said electric motor for transmitting a power between said electric motor and said wheel only when said electric motor is active;

a pair of handle shafts fixed on rear end portions of said handles and extending backward;

cylindrical grips individually covering said handle shafts coaxially and axially movable relative to said handle shafts within a limited range;

a plurality of steel balls retained between each of said handle shafts and each of said grips;

elastic means sandwiched between each said handle shaft and each said grip for biasing each said grip elastically backward;

left and right pushing force detecting sensors mounted individually at one of said grips and said handles for detecting axial movements of the grips relative to said handle shafts in accordance with pushing forces applied to said grips;

control means for controlling operation of said electric motor based on left and right detected values of said left and right pushing force detecting sensors; and rotation restricting means for restricting relative rotation, of each said grip with respect to each said handle shaft around an axis of said handle shaft, against a load applied to each of said handle shaft by said material placed on said tray frame.

2. A power-assisted wheelbarrow according to claim 1, wherein said rotation restricting means comprises a plurality of grooves individually formed in outer circumferences of said handle shafts and in inner circumferences of said grips, said plurality of grooves are spaced circumferentially of said handle shafts and said grips in at least three portions of the circumferences and extend axially to correspond to each other, so that said plurality of steel balls are retained between said handle shafts and said grips while being able to roll along said plurality of grooves.

3. A power-assisted wheelbarrow according to claim 2, further comprising cylindrical support members coaxially arranged between said outer circumferences of said handle shafts and said inner circumferences of said grips, said cylindrical support members are individually provided with a plurality of support holes in positions corresponding individually to said grooves and spaced axially, so that said steel balls are individually held rollably in said support holes.

4. A power assisted wheelbarrow comprising:

a tray frame;

a wheel carried at a center of a lower portion of said tray frame;

a pair of right and left handles respectively extending backward from two sides of said tray frame;

an electric motor mounted on said tray frame;

power transmission means interposed between said wheel and said electric motor for transmitting a power between said electric motor and said wheel only when said electric motor is active;

a pair of handle shafts fixed on rear end portions of said handles and extending backward;

cylindrical grips individually covering said handle shafts coaxially and axially movable relative to said handle shafts within a limited range;

a plurality of steel balls retained between each of said handle shafts and each of said grips;

elastic means sandwiched between each said handle shaft and each said grip for biasing each said grip elastically backward;

pushing force detecting sensors mounted individually at one of said grips and said handles for detecting axial movements of the grips relative to said handle shafts in accordance with pushing forces applied to said grips;

control means for controlling operation of said electric motor based on detected values of said pushing force detecting sensors; and a plurality of grooves individually formed in outer circumferences of said handle shafts and in inner circumferences of said grips, said plurality of grooves are spaced circumferentially of said handle shafts and said grips in at least three portions of the circumferences and extend axially to correspond to each other, so that said plurality of steel balls are retained between said handle shafts and said grips while being able to roll along said plurality of grooves.

5. A power assisted wheelbarrow according to claim 4, further comprising cylindrical support members coaxially arranged between said outer circumferences of said handle shafts and said inner circumferences of said grips, said cylindrical support members area individually provided with a plurality of support holes in positions corresponding individually to said grooves and spaced axially, so that said steel balls are individually held rollably in said support holes.

6. A power assisted wheelbarrow according to claim 1, wherein said control means controlling operation of said electric motor based upon a sum of the left and right detected values.

7. A power assisted wheelbarrow according to claim 1, wherein said control means controlling operation of said electric motor based upon a larger one of the left and right detected values.

8. A power assisted wheelbarrow comprising:

a tray frame;

a wheel carried at a center of a lower portion of said tray frame;

a pair of right and left handles respectively extending backward from two sides of said tray frame;

an electric motor mounted on said tray frame;

power transmission means interposed between said wheel and said electric motor for transmitting a power between said electric motor and said wheel only when said electric motor is active;

a pair of handle shafts fixed on rear end portions of said handles and extending backward;

cylindrical grips individually covering said handle shafts coaxially and axially movable relative to said handle shafts within a limited range;

a plurality of steel balls retained between each of said handle shafts and each of said grips;

elastic means sandwiched between each said handle shaft and each said grip for biasing each said grip elastically backward;

left and right pushing force detecting sensors mounted individually at one of said grips and said handles for detecting axial movements of the grips relative to said handle shafts in accordance with pushing forces applied to said grips;

control means for controlling operation of said electric motor based on left and right detected values of said left and right pushing force detecting sensors; and rotation restricting means for restricting relative rotation, of each said grip with respect to each said handle shaft around an axis of said handle shaft, against a load applied to each of said handle shaft by said material placed on said tray frame.

9. A power assisted wheelbarrow according to claim 8, wherein said control means controlling operation of said electric motor based upon a sum of the left and right detected values.

10. A power assisted wheelbarrow according to claim 8, wherein said control means controlling operation of said electric motor based upon a larger one of the left and right detected values.

* * * * *